United States Patent
Hourne et al.

(10) Patent No.: US 9,853,526 B2
(45) Date of Patent: Dec. 26, 2017

(54) ASSEMBLY COMPRISING AT LEAST A FIRST MOTOR, A SECOND MOTOR AND AN ANGULAR POSITION SENSOR

(71) Applicants: CONTINENTAL AUTOMOTIVE FRANCE, Toulouse (FR); CONTINENTAL AUTOMOTIVE GmbH, Hannover (DE)

(72) Inventors: Xavier Hourne, Cugnaux (FR); Simon-Didier Venzal, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 359 days.

(21) Appl. No.: 14/753,299

(22) Filed: Jun. 29, 2015

(65) Prior Publication Data
US 2016/0006323 A1    Jan. 7, 2016

(30) Foreign Application Priority Data
Jul. 4, 2014   (FR) ...................................... 1456449

(51) Int. Cl.
*H02K 11/00*   (2016.01)
*G01D 5/20*   (2006.01)
*G01D 5/22*   (2006.01)
*H02K 11/225*   (2016.01)

(52) U.S. Cl.
CPC ....... *H02K 11/0031* (2013.01); *G01D 5/2073* (2013.01); *G01D 5/225* (2013.01); *H02K 11/225* (2016.01)

(58) Field of Classification Search
CPC .................................................. H02K 11/0031
USPC ......................................... 318/652, 638, 560
See application file for complete search history.

(56) References Cited

U.S. PATENT DOCUMENTS

| | | | |
|---|---|---|---|
| 6,713,900 B2 * | 3/2004 | Yamada ................. | H02K 41/03 310/12.05 |
| 2002/0017902 A1 | 2/2002 | Vasiloiu | |
| 2013/0057263 A1 | 3/2013 | Hosek | |
| 2014/0167788 A1 | 6/2014 | Fontanet | |
| 2015/0048817 A1 | 2/2015 | Prussmeier | |

FOREIGN PATENT DOCUMENTS

| | | |
|---|---|---|
| DE | 10 2012 204917 A1 | 10/2013 |
| EP | 1 164 358 A1 | 12/2001 |

OTHER PUBLICATIONS

FR Search Report, dated Mar. 4, 2015 from corresponds to FR application.

* cited by examiner

*Primary Examiner* — David S Luo
(74) *Attorney, Agent, or Firm* — Young & Thompson (57) ABSTRACT

An assembly includes at least a first motor (10) and a second motor (20) on which first targets (13) and second targets (23) being respectively mounted, the first targets (13) and the second targets (23) are respectively distributed angularly over the first motor (10) and over the second motor (20), each first target (13) having a first angular aperture, each second target (23) having a second angular aperture, the assembly furthermore having an angular position sensor (5) positioned between the motors (10, 20) and adapted to measure the angular position of the targets (13, 23).

17 Claims, 5 Drawing Sheets

ASSEMBLY COMPRISING AT LEAST A FIRST MOTOR, A SECOND MOTOR AND AN ANGULAR POSITION SENSOR

FIELD OF THE INVENTION

The present invention relates to the field of position sensors, and more particularly to an angular position sensor for two electric motors of a motor vehicle.

BACKGROUND OF THE INVENTION

As is known, an electric motor has a stator part and a rotor part, mounted so as to move in said stator part. The electric motor furthermore has an output shaft which is linked in rotation with the rotor part.

In order to measure the angular position of the shaft of an electric motor, it is known to use a position sensor known to the person skilled in the art by the term "resolver".

Figure 1:
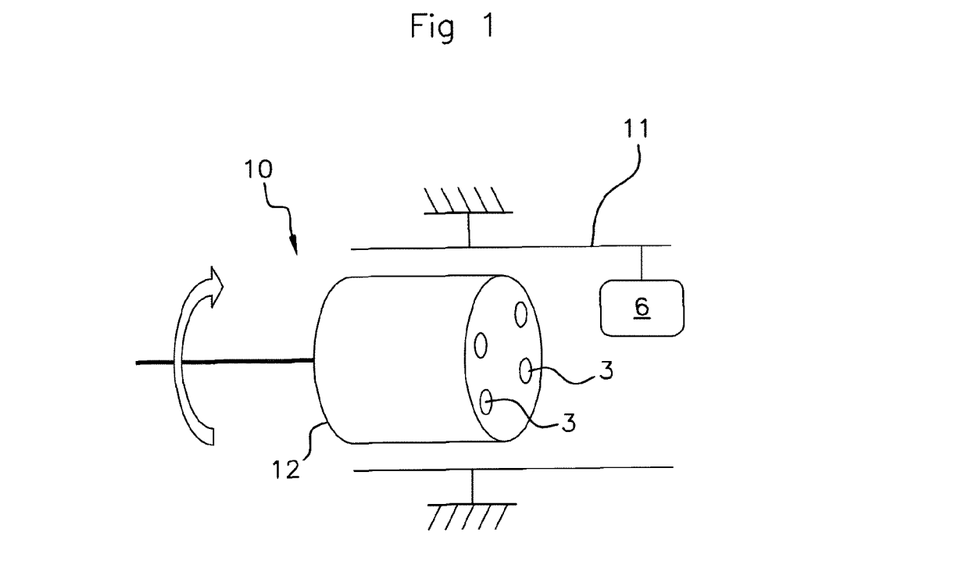
FIG. 1 is a schematic representation of a motor with a position sensor according to the prior art.

With reference to FIG. 1, an electric motor 10 having a stator part 11 and a rotor part 12 connected to an output shaft is represented schematically. A position sensor 6 is mounted in a fixed fashion with respect to the stator part 11 of the motor 10 and is adapted to detect the position of targets 3 fixed to the rotor part 12 of the motor 10, as illustrated in FIG. 1. As is known, the detection of the position of the targets 3 by the position sensor 6 is carried out by measurements of voltage between at least one emitter winding and one receiver winding of said sensor 6.

Some motor vehicle architectures have two electric motors in order to make it possible, for example, to power the two driving wheels of the vehicle independently. When they are integrated in the motor vehicle, and the two electric motors are arranged beside one another and their respective position sensors are very close together.

This results in the occurrence of interference between the two position sensors. By way of example, magnetic coupling may occur between an emitter winding of the first position sensor and a receiver winding of the second position sensor, which affects the precision of the measurement of the angular positions of the motors.

In order to eliminate this drawback, a first solution would consist in distancing the position sensors from one another, but this cannot be done in view of the compactness requirements of current motor vehicles. A second solution would be to install an insulating barrier between the two position sensors of the two motors. In practice, such an insulating barrier is liable to generate magnetic perturbations within each position sensor. Furthermore, the use of two independent sensors entails a high cost. Such a solution also cannot be adopted.

It is therefore an object of the present invention to overcome at least some of these drawbacks by providing a single position measurement device capable of precisely and reliably measuring the angular position of at least two motors close to one another.

SUMMARY OF THE INVENTION

To this end, the invention relates to an assembly comprising at least a first motor and a second motor on which identical first targets and identical second targets are respectively mounted, the first targets and the second targets being respectively distributed angularly over the first motor and over the second motor, respectively with a first angular spacing and a second angular spacing between two consecutive first targets and two consecutive second targets, each first target having a first angular aperture, each second target having a second angular aperture, the assembly furthermore having an angular position sensor positioned between said motors and adapted to measure the angular position of said targets, said angular position sensor comprising:
- a printed circuit board defining a detection window of said first targets and of said second targets,
- at least a first set of receiver windings for detecting said first targets and a second set of receiver windings for detecting said second targets in said detection window, said receiver windings extending angularly,
- each set of receiver windings having a sine receiver winding adapted to generate a sine signal when a target is detected and a cosine receiver winding adapted to generate a cosine signal when a target is detected,
- each receiver winding alternately having at least one turn oriented positively and one turn oriented negatively, each turn being formed on said printed circuit board and having an angular aperture, and
- at least one emitter winding adapted to induce an electric voltage in said receiver windings.

The invention is noteworthy in that:
- the angular aperture of a turn of the sine receiver winding of the first set is a multiple 2n of the angular aperture of a turn of the sine receiver winding of the second set, n being an integer,
- the first angular aperture of a first target of the first motor is a multiple 2n of the second angular aperture of a second target of the second motor, n being an integer,
- the angular aperture of a turn of the sine receiver winding of the first set is defined according to the following formula:

$$2 \times M1 = \lambda 1 + \beta 1$$

in which formula:
$\lambda 1$ corresponds to the first angular aperture of a first target of the first motor;
$\beta 1$ corresponds to the first angular spacing between two consecutive first targets and
the angular aperture of a turn of the sine receiver winding of the second set is defined according to the following formula:

$$2 \times M2 = \lambda 2 + \beta 2$$

In which formula:
$\lambda 2$ corresponds to the second angular aperture of a second target of the second motor;
$\beta 2$ corresponds to the second angular spacing between two consecutive second targets.

By virtue of its two sets, the position sensor can on its own measure the angular positions of two motors, which is advantageous. Furthermore, the risk of interference is limited given that the two sets are different to one another. Furthermore, since the angular aperture of a turn of the sine receiver winding of the first set is a multiple 2n of the angular aperture of a turn of the sine receiver winding of the second set, the periodicity of the sine of the first set is a multiplicity of the periodicity of the sine of the second set. The result of this is that detection by one of the sets of receiver windings of the position of the targets which are associated with the other receiver windings is not possible.

Preferably, the angular aperture of a turn of the sine receiver winding of the first set is equal to two times the angular aperture of a turn of the sine receiver winding of the second set. Thus, a target adapted to be detected by the first sine winding is transparent for the second sine winding and is thus not detected.

Preferably, the sine receiver winding of the second set has a number of turns 2n which is a multiple of the number of turns of the sine receiver winding of the first set over said detection window, n being an integer.

According to a preferred aspect, the emitter winding surrounds said receiver windings for each of the two sets so that it can be coupled therewith.

Preferably, the first set and the second set face one another in the printed circuit board so that they can cooperate with targets extending at the same radial distance from the axis of rotation of the motor on which the targets are fixed. Thus, the position sensor defines a single detection window, which limits the bulk of the position sensor.

According to a preferred aspect, the second angular spacing of two consecutive second targets of the second motor is equal to the second angular aperture of a second target of the second motor, so as not to be detected by the receiver windings of the first set.

Also preferably, the first angular spacing of two consecutive first targets of the first motor is equal to the first angular aperture of a first target of the first motor. Preferably, the first angular aperture of a first target of the first motor is equal to 45°.

BRIEF DESCRIPTION OF THE DRAWINGS

The invention will be understood more clearly on reading the description which follows, given solely by way of example, and with reference to the appended drawings, in which.

DETAILED DESCRIPTION OF THE INVENTION

It should be noted that the figures explain the invention in detail for implementation of the invention, and said figures may of course be used to define the invention better if appropriate.

The invention will be presented for a motor vehicle having two driving wheels which are respectively driven in rotation by two electric motors.

Figure 2:
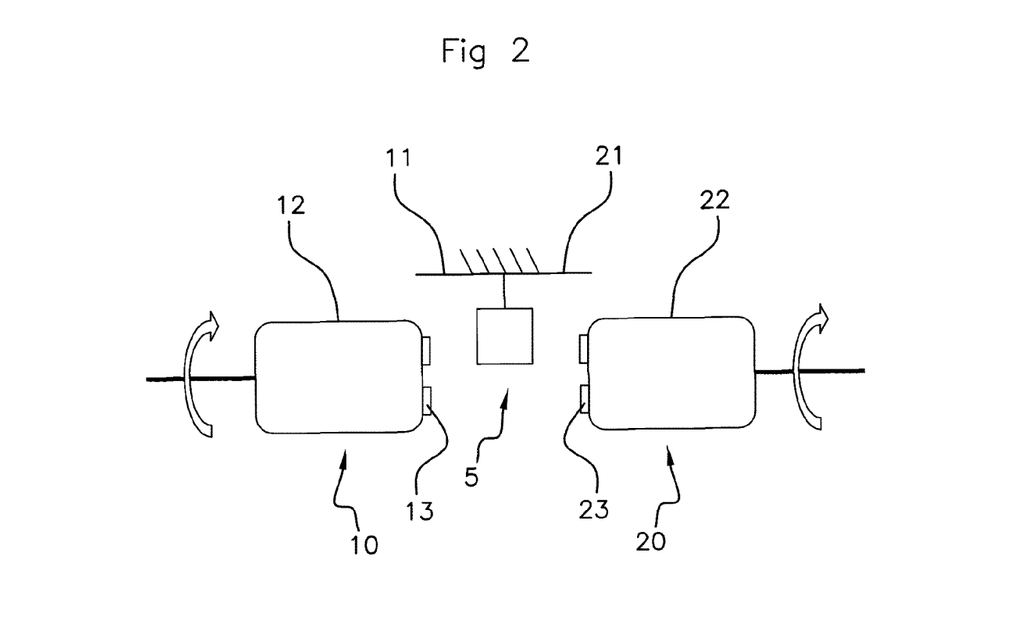
FIG. 2 is a schematic representation of an assembly of two motors with a position sensor according to the invention.

With reference to FIG. 2, the motor vehicle has a first motor 10 with a stator part 11 and a rotor part 12, mounted so as to move in said stator part 11, and a second motor 20 with a stator part 21 and a rotor part 22, mounted so as to move in said stator part 21. The rotor part 12 of the first motor 10 has first targets 13, while the rotor part 22 of the second motor 20 has second targets 23.

In this exemplary embodiment of the invention, a single position sensor 5 is mounted in a fixed fashion with respect to the stator parts 11, 21 of the motors 10, 20 and is adapted to detect the position of the targets 13, 23. The targets 13, 23 are adapted to move in front of the position sensor 5 when the motors 10, 20 are activated. The nature and the position of the targets 13, 23 will be presented below with reference to FIGS. 6 and 7.

Figure 3:
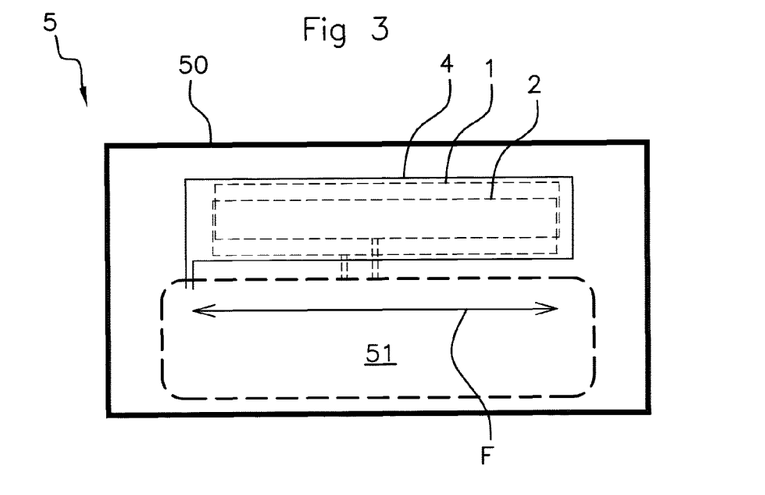
FIG. 3 is a schematic representation of a printed circuit board of the position sensor of FIG. 2 according to the invention.

With reference to FIG. 3, the position sensor 5 has a housing (not represented) in which a printed circuit board 50 is mounted.

Figure 4:
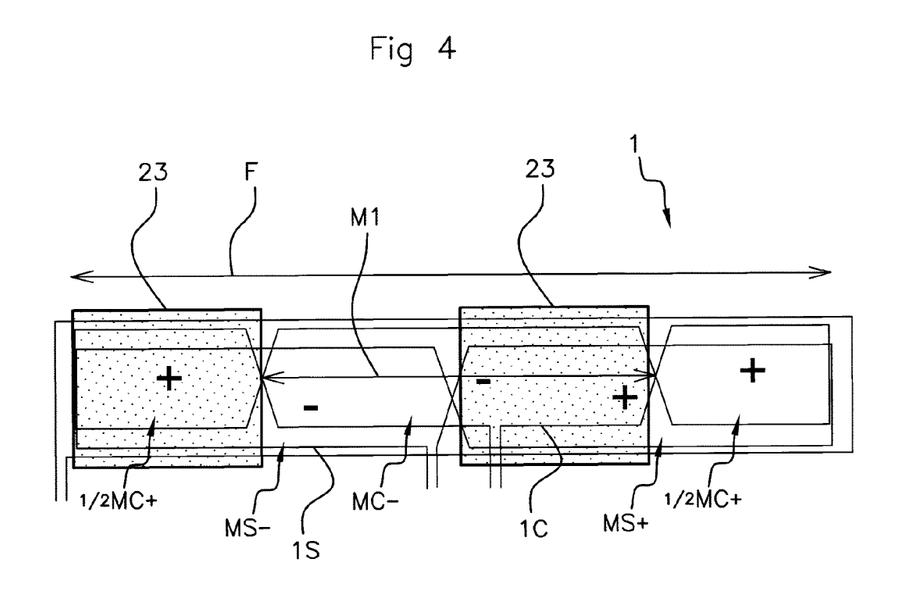
FIG. 4 is a schematic representation of a first set of windings of the printed circuit board of FIG. 3 according to the invention with a second target.
Figure 5:
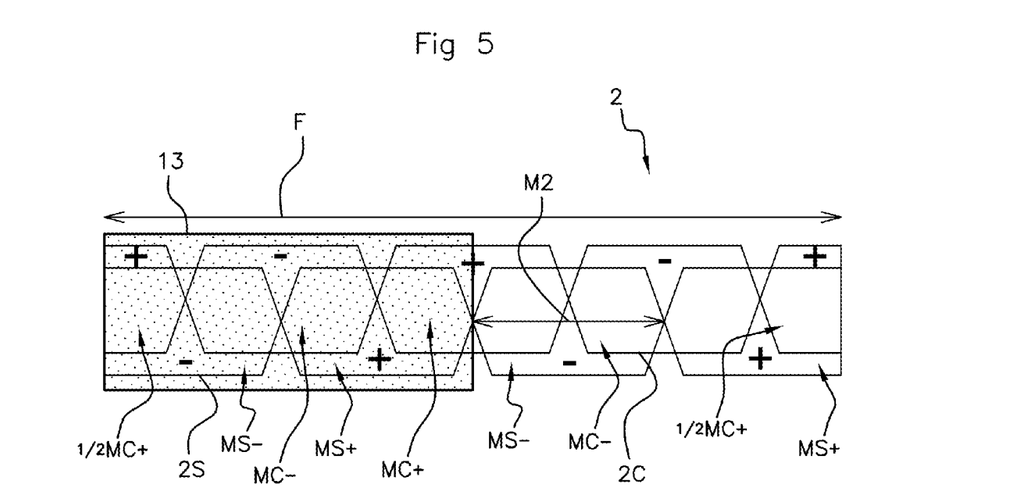
FIG. 5 is a schematic representation of a second set of windings of the printed circuit board of FIG. 3 according to the invention with a first target.

In this exemplary embodiment, the printed circuit board 50 has a first set 1 and a second set 2 of receiver windings, which are respectively represented in FIGS. 4 and 5. The sets 1, 2 are superimposed in this case, although it is clear that they could also be offset on the printed circuit board 50.

The printed circuit board 50 also has an emitter winding 4 adapted to induce an electric voltage in said receiver windings of said sets 1, 2. To this end, the emitter winding 4 surrounds said receiver windings of said sets 1, 2.

As is known, the emitter winding 4 makes it possible to create magnetic coupling with the receiver windings of said sets 1, 2. When a target is in proximity to said receiver windings, the coupling is modified and leads to a change in the current flowing through the receiver windings, which can be converted into angular position information of the target with respect to said receiver windings.

A single emitter winding 4 for creating high-frequency magnetic coupling between the receiver windings of the two sets 1, 2 has been presented, although it is clear that the sets 1, 2 could be associated with two different emitter windings 4.

Furthermore, the printed circuit board 50 has an electronic module 51 capable of managing the operation of the receiver windings of said sets 1, 2 as well as that of the emitter winding 4, in order to be able to implement the magnetic coupling and measure the currents flowing through the receiver windings.

Each set 1, 2 of receiver windings will now be presented with reference to FIGS. 4 and 5.

In practice, each set 1, 2 extends angularly so as to follow the targets 13, 23 when the motors 10, 20 are activated. Nevertheless, for the sake of clarity, the sets 1, 2 are represented "linearly", that is to say flat, with reference to FIGS. 4 and 5. In what follows, the length of a set 1, 2 corresponds to an angular measurement aperture, referred to as a detection window F or detection pattern. In this exemplary embodiment, the sets 1, 2 are superimposed and define a single detection window F. In this exemplary embodiment, the detection window F is 90°, although it is clear that it could have a different value.

With reference to FIG. 4, the first set 1 has a sine receiver winding 1S adapted to generate a sine signal when a target is detected and a cosine receiver winding 1C adapted to generate a cosine signal when a target is detected. Such sine 1S and cosine 1C windings are known to the person skilled in the art and will not be presented in more detail.

In order to obtain the desired sine and cosine signals, still with reference to FIG. 4, the sine receiver winding 1S has two turns: a full turn MS− oriented negatively and a full turn MS+ oriented positively. The cosine receiver winding 1C has two turns: a first positive half-turn ½MC+, a full negative turn MC− and a second positive half-turn ½MC+.

Thus, in the absence of a target, the magnetic field of the positive turns compensates for that of the negative turns and the magnetic resultant of the turns is zero for each receiver winding 1S, 1C. Conversely, in the presence of a target, this equilibrium is modified and knowledge of a voltage of the sine winding 1S and of the cosine winding 1C makes it possible to determine precisely the angular position of a target in the detection window F.

In this example, with reference to FIG. 4, all the full turns of the windings 1S, 1C have the same angular aperture. For a measurement window F of 90°, given that the sine winding 1S of the first set 1 has only two turns, the angular aperture of a full turn M1 of the first set 1 is 45°.

Figure 6:
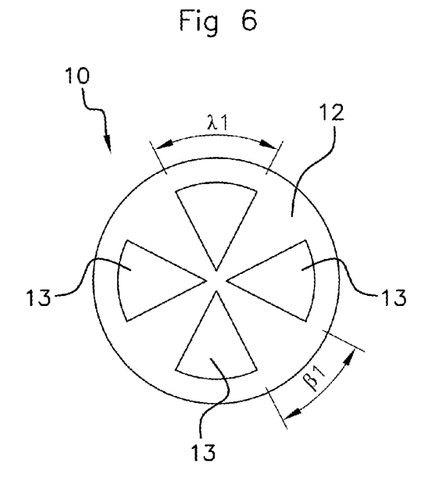
FIG. 6 is a schematic representation of the first motor of FIG. 2 according to the invention equipped with first targets.

According to the invention, the first set 1 is adapted to detect the first targets 13 of the first motor 10. With reference to FIG. 6, the first targets 13 are identical to one another and are distributed angularly at the periphery of the rotor part 12 of the first motor 10. In this exemplary embodiment, there are four first targets 13, although it is clear that there could be more or fewer of them. The first targets 13 are in the form of annular sectors consisting of a nonmagnetic material, such as aluminum.

Still with reference to FIG. 6, the first targets 13 are distributed at the periphery of the rotor part 12 of the first motor 10 so that two consecutive first targets 13 are spaced apart by a first angular spacing β1. Furthermore, each first target 13 has a first angular aperture λ1.

In this embodiment of the invention, the first angular aperture λ1 of a first target 13 is equal to the angular aperture of a full turn M1 of the first set 1, i.e. equal to 45°. Also preferably, the first angular spacing β1 between two first targets 13 is equal to the first angular aperture λ1.

This is because it is necessary according to the invention for the first target 13 to fully cover a full turn of the first set 1 then for the next full turn M1 not to be covered by a first target, in order to generate a usable signal. Thus, the angular aperture of a full turn M1 of the first set 1 is at least equal to the first angular aperture λ1, and is preferably also equal to the first angular spacing β1.

The first angular aperture λ1 may slightly exceed the angular aperture of a full turn M1 (for example by +10%), but it is then necessary for the first angular spacing β1 to be slightly less than the angular aperture of a full turn M1 (for example −10%) in order to satisfy the following equation:

$$2 \times M1 = \lambda1 + \beta1$$

According to the invention, the angular aperture M1 of a turn of the sine receiver winding of the first set 1 is defined according to the following formula:

$$2 \times M1 = \lambda1 + \beta1$$

preferably with:

$$M1 = \lambda1 = \beta1$$

in which formula:

λ1 corresponds to the first angular aperture of a first target 13 of the first motor 10;

β1 corresponds to the first angular spacing between two consecutive first targets 13.

The equality of the formula above is preferably strict, although it is clear that a difference of less than 10% is tolerable.

With reference to FIG. 5, the second set 2 has a sine receiver winding 2S adapted to generate a sine signal when a target is detected, and a cosine receiver winding 2C adapted to generate a cosine signal when a target is detected. Such sine 2S and cosine 2C windings are known to the person skilled in the art and will not be presented in more detail.

In order to avoid any interference with the first set 1 of receiver windings 1S, 1C, according to the invention the receiver windings 2S, 2C of the second set 2 are defined as a function of the receiver windings 1S, 1C of the first set 1.

In particular, over the detection window F, the sine receiver winding 2S of the second set 2 has a number of turns which is a multiple of the number of turns of the sine receiver winding 1S of the first set 1. In this exemplary embodiment, the sine receiver winding 2S of the second set 2 has a number of turns two times higher than the number of turns of the sine receiver winding 1S of the first set 1.

To this end, with reference to FIG. 5, the sine receiver winding 2S has four turns: two full turns MS− oriented negatively and two full turns MS+ oriented positively, the positive turns MS+ alternating with the negative turns MS−. Likewise, the cosine receiver winding 2C has four turns: a first positive half-turn ½MC+, a negative full turn MC−, a positive full turn MC+, a negative full turn MC− and a second positive half-turn ½MC+.

With reference to FIG. 5, all the full turns of the windings 2S, 2C have the same angular aperture. In this example, the angular aperture of a full turn M2 of the second set 2 is 22.5° (i.e. 45°/2), that is to say two times less than that of a full turn M1 of the first set 1 (n=1).

According to the invention, the second set 2 is adapted to detect the second targets 23 of the second motor 20.

Figure 7:
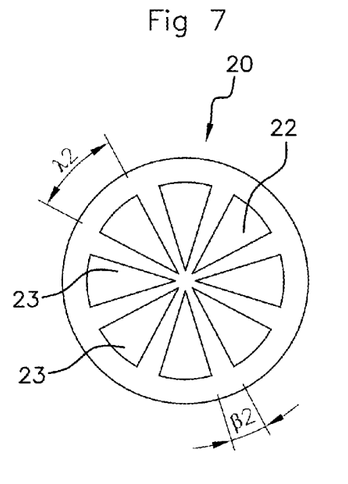
FIG. 7 is a schematic representation of the second motor of FIG. 2 according to the invention equipped with second targets.

With reference to FIG. 7, the second targets 23 are identical to one another and are distributed angularly at the periphery of the rotor part 22 of the second motor 20. In this exemplary embodiment, there are eight second targets 23, although it is clear that there could be more or fewer of them. The second targets 23 are in the form of annular sectors consisting of a nonmagnetic material, such as aluminum.

Still with reference to FIG. 7, the second targets 23 are distributed at the periphery of the rotor part 22 of the second motor 20 so that two consecutive second targets 23 are spaced apart by a second angular spacing β2. Furthermore, each second target 23 has a second angular aperture λ2.

In this embodiment of the invention, the second angular aperture λ2 of a second target 23 is equal to the angular aperture of a full turn M2 of the second set 2, that is to say equal to 22.5°. Also preferably, the second angular spacing β2 between two second targets 23 is equal to the second angular aperture λ2. In other words, the second angular aperture λ2 and the second angular spacing β2 of the second targets 23 are reduced by half in comparison with the first angular aperture λ1 and the first angular spacing β1 the first targets 13.

This is because it is necessary according to the invention for the second target 23 to fully cover a full turn of the second set 2 then for the next turn not to be covered by a second target, in order to generate a usable signal. Thus, the angular aperture of a full turn M2 of the second set 2 is at least equal to the second angular aperture λ2, and is preferably also equal to the second angular spacing β2.

The second angular aperture λ2 may slightly exceed the angular aperture of a full turn M2 of the second set 2 (for example by +10%), but it is then necessary for the second angular spacing β2 to be slightly less than the angular aperture of a full turn M2 (for example −10%) in order to satisfy the following equation:

$$2 \times M2 = \lambda2 + \beta2$$

In other words, the angular aperture of a turn M2 of the sine receiver winding 2S of the second set 2 is defined by the following formula:

$$2 \times M2 = \lambda2 + \beta2$$

preferably with:

$$M2 = \lambda2 = \beta2$$

in which formula:
λ2 corresponds to the second angular aperture of a second target 23 of the second motor 20;
β2 corresponds to the second angular spacing between two consecutive second targets 23.

The equality of the formula above is preferably strict, although it is clear that a difference of less than 10% is tolerable.

An example of the implementation of the invention will be presented with reference to FIGS. 4 to 7.

When the vehicle is moving, the first motor 10 and the second motor 20 are active and their targets 13, 23 are driven in rotation. The position sensor 5 sees the first targets 13 and the second targets 23 move past in front of the detection window F.

In practice, the position sensor 5 measures the angular position of the first targets 13 and of the second targets 23 simultaneously.

For the sake of clarity, the measurement of the angular position of the first targets 13 will be presented first, followed by the measurement of the angular position of the second targets 23.

During the rotation of the first motor 10, the first targets 13 are driven in rotation, as illustrated in FIG. 2, in front of the position sensor 5 and, more particularly, the two sets 1, 2 of receiver windings.

During the rotation of the first targets 13 in front of the first set 1 of receiver windings 1S, 1C, the angular position of the first targets 13 is identified, given that the first angular aperture λ1 of the first targets 13 corresponds to the angular aperture of a full turn M1 of the first set 1. In other words, a first target 13 can interact with a full turn M1 and thus unbalance the resultant of the magnetic field of the first sine winding 1S and of the first cosine winding 1C. Thus, sine and cosine signals are formed and transmitted by the first set 1 in order to determine the angular position of the first targets 13.

Furthermore, during the rotation of the first targets 13 in front of the second set 2 of receiver windings 2S, 2C, the influence of the first targets 13 is transparent for the receiver windings 2S, 2C of the second set 2. This is because, given that the first angular aperture λ1 of the first targets 13 corresponds to two times the angular aperture of a full turn M2 of the second set 1, a first target 13 simultaneously covers a turn oriented positively and a turn oriented negatively of the receiver windings 2S, 2C of the second set 2, as illustrated in FIG. 5. In other words, the magnetic resultant of the influence of a first target 13 on the second set 2 is zero, the second set 2 being insensitive to the first targets 13 of the first motor 10.

Thus, by virtue of the invention, the angular position of the motor 10 is identified by the first set 1 of the position sensor 5 without affecting the second set 2.

During the rotation of the second motor 20, the second targets 23 are driven in rotation as illustrated in FIG. 2, in front of the position sensor 5 and more particularly the two sets 1, 2 of receiver windings.

During the rotation of the second targets 23 in front of the second set 2 of receiver windings 2S, 2C, the angular position of the second targets 23 is identified, given that the second angular aperture λ2 of the second targets 23 corresponds to the angular aperture of a full turn M2 of the second set 2. Otherwise, the relationship between the second targets 23 and the second set 2 is similar to the relationship between the first targets 13 and the first set 1 as presented above.

Thus, a second target 23 can interact with a full turn and thus unbalance the resultant of the magnetic field of the second sine winding 2S and of the second cosine winding 2C. Thus, sine and cosine signals are formed and transmitted by the second set 2 in order to determine the angular position of the second targets 23.

Furthermore, during the rotation of the second targets 23 in front of the first set 1 of receiver windings 1S, 1C, the influence of the second targets 23 is transparent for the receiver windings 1S, 1C of the first set 1. This is because, given that on the one hand the second angular aperture λ2 of the second targets 23 is two times less than the angular aperture of a full turn M1 of the first set 1, and on the other hand that the second angular spacing β2 between two second targets 23 is equal to the second angular aperture λ2, two second targets 23 simultaneously cover a half-turn oriented positively and a half-turn oriented negatively of the receiver windings 1S, 1C of the first set 1, as illustrated in FIG. 4. In other words, the magnetic resultant of the influence of a second target 23 on the first set 1 is zero, the first set 1 being insensitive to the second targets 23 of the second motor 20.

Thus, by virtue of the invention, the angular position of the second motor 20 is identified by the second set 2 of the position sensor 5 without affecting the first set 1.

A single position sensor 5 can thus simultaneously determine the angular position of two separate motors 10, 20 without risk of interference. Such a position sensor 5 with double measurements has a restricted size and a reduced cost, which allows it to be integrated into any motor vehicle configuration.

Other embodiments will be presented for a detection window F with an angular aperture of 90°.

Figure 8:
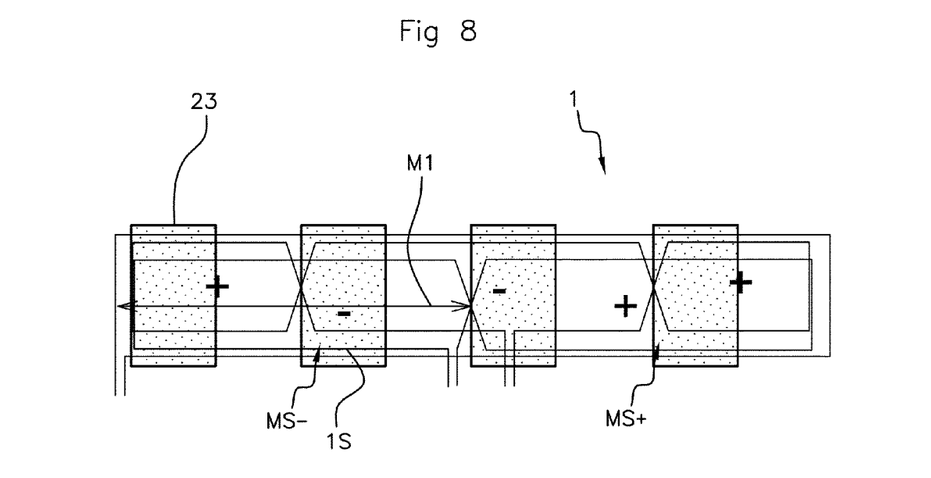
FIG. 8 is a schematic representation of a first set of windings of the printed circuit board according to the invention, the sine receiver winding of which has two turns.
Figure 9:
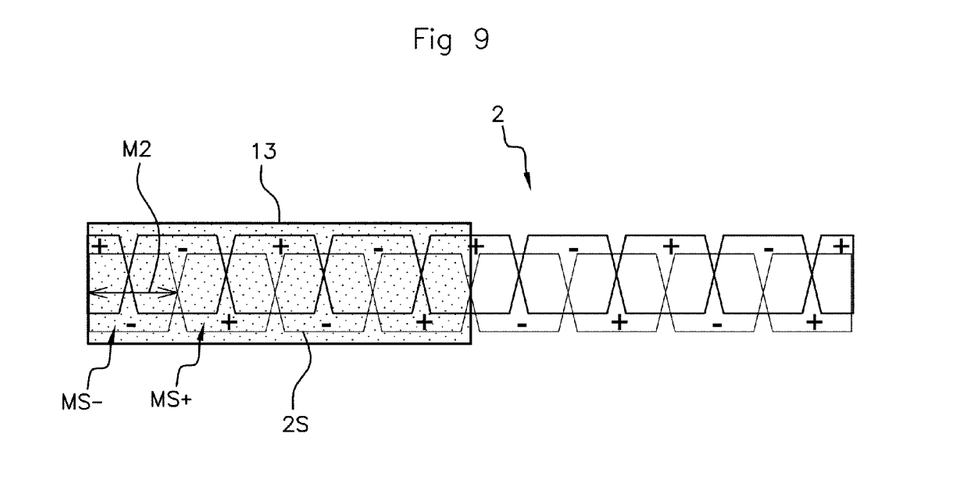
FIG. 9 is a schematic representation of a second set of windings of the printed circuit board according to the invention, the sine receiver winding of which has eight turns.

With reference to FIGS. 8 and 9, a second embodiment of the invention is represented. As illustrated in FIG. 8, in a similar way to FIG. 4, the sine receiver winding 1S of the first set 1 has two turns: a full turn MS− oriented negatively and a full turn MS+ oriented positively. Similarly, the first angular aperture λ1 of a first target 13 is equal to the angular aperture of a full turn M1 of the first set 1, that is to say equal to 45°.

With reference to FIG. 9, the sine receiver winding 2S of the second set 2 has eight turns, the positive turns MS+ alternating with the negative turns MS−. In this example, the angular aperture of a full turn M2 of the second set 2 is 11.25°, that is to say four times less than that of a full turn M1 of the first set 1 (n=2). The second angular aperture λ2 of a second target 23 is equal to the angular aperture of a full turn M2 of the second set 2, that is to say equal to 11.25°.

Also preferably, the second angular spacing β2 between two second targets 23 is equal to the second angular aperture λ2.

Thus, with reference to FIG. 8, two second targets 23 are present simultaneously on the first negative turn MS− and two second targets 23 are present simultaneously on the second positive turn MS+. The magnetic resultant being zero, the first set 1 is insensitive to the second targets 23 of the second motor 20.

Figure 10:
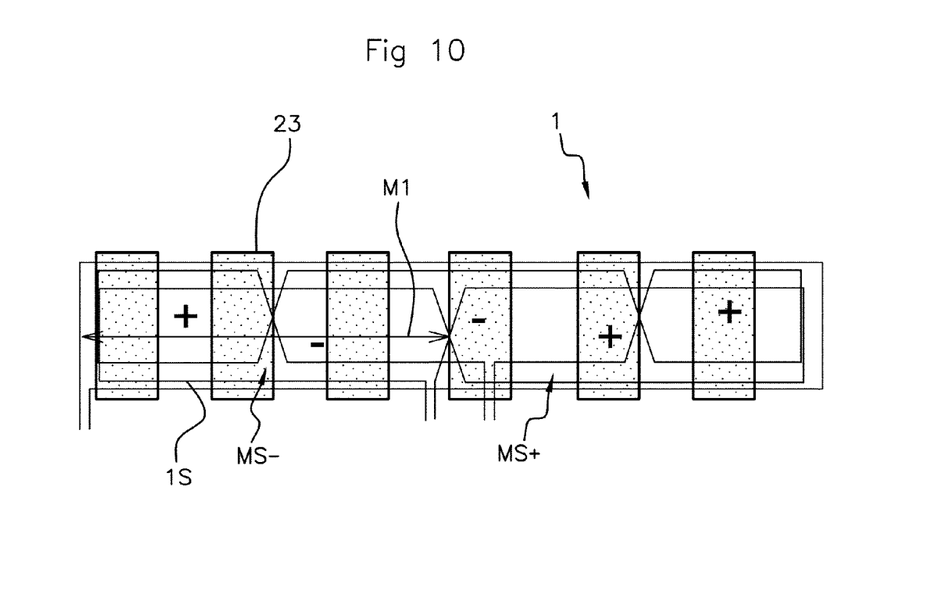
FIG. 10 is a schematic representation of a first set of windings of the printed circuit board according to the invention, the sine receiver winding of which has two turns.
Figure 11:
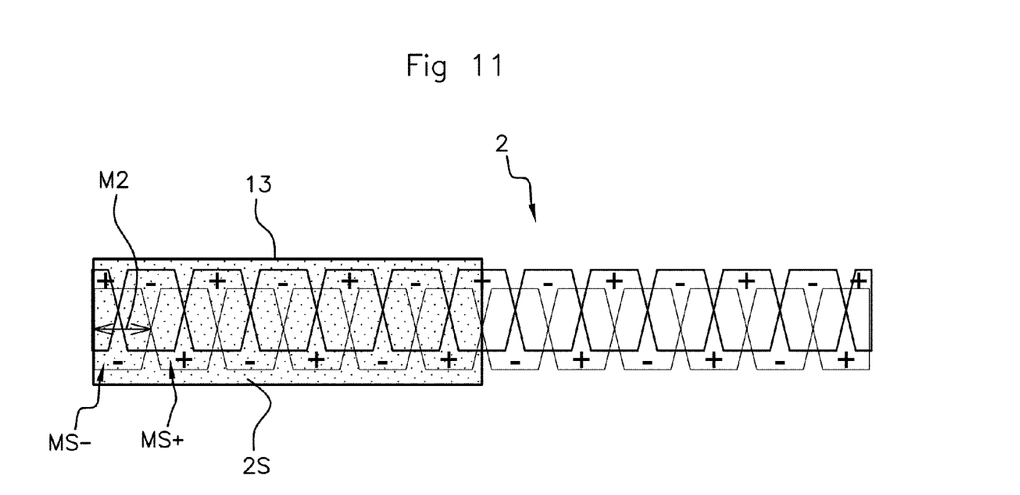
FIG. 11 is a schematic representation of a second set of windings of the printed circuit board according to the invention, the sine receiver winding of which has twelve turns.

With reference to FIGS. 10 and 11, a third embodiment of the invention is represented. The sine receiver winding 1S of the first set 1 has two turns: a full turn MS− oriented negatively and a full turn MS+ oriented positively. Similarly, the first angular aperture λ1 of a first target 13 is equal to the angular aperture of a full turn M1 of the first set 1, that is to say equal to 45°.

With reference to FIG. 11, the sine receiver winding 2S of the second set 2 has twelve turns, the positive turns MS+ alternating with the negative turns MS−. In this example, the angular aperture of a full turn M2 of the second set 2 is 7.5°, that is to say six times less than that of a full turn M1 of the first set 1 (n=3). The second angular aperture λ2 of a second target 23 is equal to the angular aperture of a full turn M2 of the second set 2, that is to say equal to 7.5°. Also preferably, the second angular spacing β2 between two second targets 23 is equal to the second angular aperture λ2.

Thus, with reference to FIG. 11, three second targets 23 are present simultaneously on the first negative turn MS− and three second targets 23 are present simultaneously on the second positive turn MS+. The magnetic resultant being zero, the first set 1 is insensitive to the second targets 23 of the second motor 20.

The invention claimed is:

1. An assembly comprising at least a first motor (10) and a second motor (20) on which identical first targets (13) and identical second targets (23) being respectively mounted, the first targets (13) and the second targets (23) are respectively distributed angularly over the first motor (10) and over the second motor (20), respectively with a first angular spacing (β1) and a second angular spacing (β2) between two consecutive first targets (13) and two consecutive second targets (23), each first target (13) having a first angular aperture (λ1), each second target (23) having a second angular aperture (λ2), the assembly furthermore having an angular position sensor (5) positioned between said motors (10, 20) and adapted to measure the angular position of said targets (13, 23), said angular position sensor (5) comprising:
    a printed circuit board (50) defining a detection window (F) of said first targets (13) and of said second targets (23),
    at least a first set (1) of receiver windings (1S, 1C) for detecting said first targets (13) and a second set (2) of receiver windings (2S, 2C) for detecting said second targets (23) in said detection window (F), said receiver windings (1S, 1C, 2S, 2C) extending angularly,
    each set of receiver windings (1, 2) having a sine receiver winding (1S, 2S) adapted to generate a sine signal when a target (13, 23) is detected and a cosine receiver winding (1C, 2C) adapted to generate a cosine signal when a target (13, 23) is detected,
    each receiver winding (1S, 1C, 2S, 2C) alternately having at least one turn oriented positively and one turn oriented negatively, each turn being formed on said printed circuit board (50) and having an angular aperture, and
    at least one emitter winding (4) adapted to induce an electric voltage in said receiver windings (1S, 1C, 2S, 2C), the assembly being characterized in that:
    the angular aperture of a turn (M1) of the sine receiver winding (1S) of the first set (1) is a multiple 2n of the angular aperture of a turn (M2) of the sine receiver winding (2S) of the second set (2), n being an integer,
    the first angular aperture (λ1) of a first target (13) of the first motor (10) is a multiple 2n of the second angular aperture (λ2) of a second target (23) of the second motor (20), n being an integer,
    the angular aperture of a turn (M1) of the sine receiver winding (1S) of the first set (1) is defined as claimed in the following formula:

$$2 \times M1 = \lambda1 + \beta1$$

with:
    λ1: the first angular aperture of a first target (13) of the first motor (10);
    β1: the first angular spacing between two consecutive first targets (13) and
    the angular aperture of a turn (M2) of the sine receiver winding (2S) of the second set (2) is defined as claimed in the following formula:

$$2 \times M2 = \lambda2 + \beta2$$

with
    λ2: the second angular aperture of a second target (23) of the second motor (20);
    β2: the second angular spacing between two consecutive second targets (23).

2. The assembly as claimed in claim 1, wherein the first angular aperture (λ1) of a first target (13) of the first motor (10) is equal to two times the value of the second angular aperture (λ2) of a second target (23) of the second motor (20).

3. The assembly as claimed in claim 2, wherein the angular aperture of a turn (M1) of the sine receiver winding (1S) of the first set (1) is equal to two times the angular aperture of a turn (M2) of the sine receiver winding (2S) of the second set (2).

4. The assembly as claimed in claim 2, wherein the emitter winding (51) surrounds said receiver windings (1S, 1C, 2S, 2C) of the two sets (1, 2).

5. The assembly as claimed in claim 2, wherein the second angular spacing (β2) of two consecutive second targets (23) of the second motor (20) is equal to the second angular aperture (λ2) of a second target (23) of the second motor (20).

6. The assembly as claimed in claim 2, wherein the first angular spacing (β1) of two consecutive first targets (13) of the first motor (10) is equal to the first angular aperture (λ1) of a first target (13) of the first motor (10).

7. The assembly as claimed in claim 1, wherein the angular aperture of a turn (M1) of the sine receiver winding (1S) of the first set (1) is equal to two times the angular aperture of a turn (M2) of the sine receiver winding (2S) of the second set (2).

8. The assembly as claimed in claim 7, wherein the emitter winding (51) surrounds said receiver windings (1S, 1C, 2S, 2C) of the two sets (1, 2).

9. The assembly as claimed in claim 7, wherein the second angular spacing (β2) of two consecutive second targets (23) of the second motor (20) is equal to the second angular aperture (λ2) of a second target (23) of the second motor (20).

10. The assembly as claimed in claim 7, wherein the first angular spacing (β1) of two consecutive first targets (13) of the first motor (10) is equal to the first angular aperture (λ1) of a first target (13) of the first motor (10).

11. The assembly as claimed in claim 1, wherein the emitter winding (51) surrounds said receiver windings (1S, 1C, 2S, 2C) of the two sets (1, 2).

12. The assembly as claimed in claim 11, wherein the second angular spacing (β2) of two consecutive second targets (23) of the second motor (20) is equal to the second angular aperture (λ2) of a second target (23) of the second motor (20).

13. The assembly as claimed in claim 11, wherein the first angular spacing (β1) of two consecutive first targets (13) of the first motor (10) is equal to the first angular aperture (λ1) of a first target (13) of the first motor (10).

14. The assembly as claimed in claim 1, wherein the second angular spacing (β2) of two consecutive second targets (23) of the second motor (20) is equal to the second angular aperture (λ2) of a second target (23) of the second motor (20).

15. The assembly as claimed in claim 14, wherein the angular aperture (λ1) of a first target (13) of the first motor (20) is equal to 45°.

16. The assembly as claimed in claim 14, wherein the first angular spacing (β1) of two consecutive first targets (13) of the first motor (10) is equal to the first angular aperture (λ1) of a first target (13) of the first motor (10).

17. The assembly as claimed in claim 1, wherein the first angular spacing (31) of two consecutive first targets (13) of the first motor (10) is equal to the first angular aperture (λ1) of a first target (13) of the first motor (10).

* * * * *